(12) United States Patent
Rabhi

(10) Patent No.: US 8,893,673 B2
(45) Date of Patent: Nov. 25, 2014

(54) VARIABLE COMPRESSION RATIO ENGINE TUBULAR CONTROL VALVE

(76) Inventor: Vianney Rabhi, Lyons (FR)

(*) Notice: Subject to any disclaimer, the term of this patent is extended or adjusted under 35 U.S.C. 154(b) by 357 days.

(21) Appl. No.: 13/335,166

(22) Filed: Dec. 22, 2011

(65) Prior Publication Data

US 2012/0174895 A1 Jul. 12, 2012

Related U.S. Application Data

(60) Provisional application No. 61/427,290, filed on Dec. 27, 2010.

(30) Foreign Application Priority Data

Dec. 23, 2010 (FR) ..................... 10/05058

(51) Int. Cl.
*F02B 75/04* (2006.01)
*F16K 31/06* (2006.01)

(52) U.S. Cl.
CPC ........... *F02B 75/045* (2013.01); *F16K 31/0655* (2013.01)
USPC .................. 123/78 AA; 123/78 A; 123/78 B; 123/78 BA; 123/78 R; 123/48 R; 251/129.15; 251/129.05; 251/129.16; 29/888.06

(58) Field of Classification Search
CPC ...................................................... F02D 15/00
USPC .. 123/70 R, 48 B, 90.12, 78 AA, 78 R, 48 D, 123/48 R; 251/129.15, 129.05, 129.16
See application file for complete search history.

(56) References Cited

U.S. PATENT DOCUMENTS

| | | | | |
|---|---|---|---|---|
| 5,005,803 A | * | 4/1991 | Fritz et al. | ................. 251/129.15 |
| 5,516,076 A | * | 5/1996 | Stobbs et al. | ............ 251/129.16 |
| 6,105,931 A | * | 8/2000 | Frank et al. | ............... 251/129.15 |
| 2010/0154748 A1 | | 6/2010 | Rabhi | |
| 2010/0206270 A1 | | 8/2010 | Rabhi | |
| 2010/0218745 A1 | | 9/2010 | Rabhi | |
| 2010/0258074 A1 | | 10/2010 | Rabhi | |
| 2010/0288237 A1 | | 11/2010 | Rabhi | |

FOREIGN PATENT DOCUMENTS

| | | |
|---|---|---|
| FR | 2 896 539 | 7/2007 |
| FR | 2 896 544 | 7/2007 |
| FR | 2 919 022 | 1/2009 |
| FR | 2 933 140 | 1/2010 |
| FR | 2 933 141 | 1/2010 |
| WO | 98/51911 | 11/1998 |

(Continued)

*Primary Examiner* — Lindsay Low
*Assistant Examiner* — Kevin Lathers
(74) *Attorney, Agent, or Firm* — Young & Thompson

(57) ABSTRACT

A tubular valve for adjusting the compression ratio of a variable compression ratio engine includes a straight tube capable of longitudinal translational movement in a valve casing including a low-pressure chamber, the straight tube including a first end opening into the low-pressure chamber and a second end opening into a high-pressure chamber, the second end adapted to contact with at least one shut-off surface secured to the valve casing to seal the second end, the straight tube contacting the shut-off surface by at least one nonreturn and shut-off spring; sealing element for sealing between the external surface of the straight tube and the valve casing isolating the high-pressure chamber from the low-pressure chamber, the sealing element including a nonreturn tube inside which the straight tube is held; and an electric actuator for applying to the straight tube a force opposing that of the spring.

26 Claims, 9 Drawing Sheets

(56) References Cited

FOREIGN PATENT DOCUMENTS

| WO | 00/31377 | 6/2000 |
| WO | 03/008783 | 1/2003 |
| WO | 2007/085739 | 8/2007 |
| WO | WO 2008/145837 A1 * 12/2008 | ............ F02B 75/04 |

* cited by examiner

VARIABLE COMPRESSION RATIO ENGINE TUBULAR CONTROL VALVE

The present invention relates to a tubular valve for controlling the compression ratio of a variable compression ratio engine.

International patents WO 98/51911, WO 00/31377 and WO 03/008783 in the name of the applicant, disclose various mechanical devices for variable cylinder capacity engines.

It will be noticed that international patent WO 98/51911 in the name of the applicant describes a device used to improve the efficiency of internal combustion piston engines used at variable speed and load by adapting their effective cylinder capacity and/or their volumetric ratio while they are running. As this type of engine is known to those skilled in the art by the name of "variable compression ratio engine", it is this name that will be used throughout the text which follows.

It will be observed that, according to international patent WO 00/31377 in the name of the applicant, the mechanical transmission device for a variable compression ratio engine comprises a combustion piston, secured at its lower part to a transmission member, collaborating firstly with a rolling guidance device and secondly with a gearwheel secured to a connecting rod that transmits movement between said piston and said connecting rod.

It will be noted that in international patent WO 03/008783 in the name of the applicant, the mechanical transmission device for a variable compression ratio engine comprises at least one cylinder in which there moves a combustion piston which is secured, at its lower part, to a transmission member also termed "piston rack" collaborating firstly by means of a small-sized rack with a rolling guidance device and secondly by means of another, large-sized, rack, with a gearwheel secured to a connecting rod. Said mechanical transmission device for a variable compression ratio engine also comprises at least one control rack collaborating with the gearwheel, means of attaching the combustion piston to the transmission member which offer a clamping preload, connecting means that stiffen the teeth of the racks, and means of reinforcing and lightening the structure of the gearwheel.

It will be noted that the minimal operating clearance between the tooth sets of the large-dimension racks and those of the gearwheel is fixed by the location of rolling surfaces produced on said large-dimension racks and on said gearwheel.

It will be noted that in patent application FR 2 896 544 the variable compression ratio engine comprises a common cylinder head which collaborates with a crankcase to close, on the one hand, the end of at least one cylinder of the engine at its combustion chamber and, on the other hand, the end of at least one cylinder of an actuating cylinder that controls said engine at the upper chamber of said actuating cylinder, said crankcase containing all of the components of the moving linkage of the variable compression ratio engine.

It will be noted that in patent application FR 2 896 539 the variable compression ratio engine has at least one press actuating cylinder which allows the rolling surfaces to remain in constant contact with one another in order to keep control over the noise emissions of said engine and widen the manufacturing tolerances on its crankcase, said variable compression ratio engine having as many press actuating cylinders and control actuating cylinders as it has engine cylinders.

It will also be noted that in patents WO 98/51911 and FR 2 896 539, the vertical position of the variable compression ratio engine control rack is controlled by a control actuating cylinder which has an inlet for pressurized hydraulic fluid intended to compensate for any leaks there might be from said control actuating cylinder, and to provide a preload pressure aimed at improving the precision with which the vertical position datum of said control actuating cylinder is maintained by reducing the effects of the compressibility of the oil, and which is aimed at avoiding any cavitation phenomenon inside the chambers of said actuating cylinder.

It will be noticed in patent WO 98/51911 that the control actuating cylinder comprises a lower chamber and an upper chamber of which the cylinder capacity is kept identical to that of said lower chamber by an extension of the actuating cylinder rod also known as actuating cylinder upper rod. Still according to patent WO 98/51911, the control actuating cylinder also comprises an actuating cylinder piston, valves held in place by springs, and a control rod, the upper end of said actuating cylinder being closed by a cylinder head which comprises means of sealing between said cylinder head and said upper actuating cylinder rod on the one hand and between said cylinder head and said control rod on the other.

As claimed in French patent applications FR 2 896 539 and FR 07/05237 in the name of the applicant, the variable compression ratio engine comprises a hydraulic unit designed on the one hand to supply its press actuating cylinder or cylinders with the hydraulic pressure they need to operate, and on the other hand to provide its control actuating cylinder or cylinders with the hydraulic pressure they need to compensate for any hydraulic leaks they might experience and to increase their position. It will be noted that said unit is supplied with oil from the engine lubrication circuit by a high-pressure pump that can be driven by any one of the camshafts of the variable compression ratio engine, said unit then supplying the control actuating cylinder or cylinders and the press actuating cylinder or cylinders of said engine.

It will be noticed according to French patent application FR 2 896 539 or WO 2007/085739 in the name of the applicant, that the hydraulic pressure supplied to the control actuating cylinder can also be used to increase the speed of travel of said control actuating cylinder during operations aimed at increasing the volumetric ratio of the variable compression ratio engine. In this last variant, said hydraulic pressure is applied to the upper face of the upper rod of the control actuating cylinder by means of a chamber formed in the cylinder head of said actuating cylinder.

It will be observed that in the patent applications and patents in the name of the applicant, the control rod can advantageously be replaced by electrically operated valves which collaborate with at least one sensor, so as to simplify the production of the variable compression ratio engine compression ratio control system.

However, given the difficulty there is in creating electrically operated valves that are at once reliable, economical and compatible with the impurities and particles contained in the variable compression ratio engine lubricating oil, French patent application FR 08/03589 in the name of the applicant proposes replacing said electrically operated valves with a compression ratio adjusting device that involves the lifting of balls and comprises at least two balls or check valves each resting on a seat and respectively shutting off one and the other end of a transfer canal that connects the lower chamber and the upper chamber of the variable compression ratio engine control actuating cylinder, said balls acting like a nonreturn valve when held on their seat by a spring so as to allow the hydraulic fluid to pass in just one direction.

It can be seen from this latter patent application that said balls can be lifted off their seat by lift means so as to allow said hydraulic fluid to pass in both directions, said valve lift means lifting said balls through the agency of a cylindrical push rod. According to this patent application, the valve lift means may consist of electromechanical actuators that can be produced in many variants, two of them providing two different heights to which said balls are lifted off their seats, while another provides for incremental valve lift. In said patent application, two variants are also claimed, that use piezoelectric components, together with a stepped variant that comprises a piston allowing the cylindrical push rod to be operated in a longitudinal translational movement, it being possible for said piston to use the pressure obtaining in the hydraulic unit of the variable compression ratio engine by means of an electrically operated valve in order to lift the ball off its seat.

It will be observed that French patent FR 2 933 140 in the name of the applicant was varied, via French patent FR 2 933 141, again in the name of the applicant. In the latter patent, the means of lifting the balls advantageously consist of a screw-operated device comprising a rotary electric motor which turns said screw via mechanical transmission means.

This device still allows the ball to be lifted off or set back down on its seat, but with control over the height to which said ball is lifted continuously and with great precision. Unlike some of the variants claimed in French patent FR 2 933 140 in the name of the applicant, the screw-operated device presents no risk of wear liable to affect the precision or repeatability of the height to which said ball is lifted.

The tubular valve for controlling the compression ratio of a variable compression ratio engine is designed to solve a series of problems connected with the ball-lift compression ratio adjusting devices as described in French patent applications FR 2 933 140 and FR 2 933 141 in the name of the applicant and to which reference has just been made, and including the following:

- a very high force has to be produced in order to lift the ball off its seat when the pressure obtaining in the corresponding chamber of the control actuating cylinder is high. When an electromagnetic suction cup is chosen by way of means for lifting the ball, this force entails fitting said suction cup with a large coil. Because it is bulky, this coil becomes difficult to incorporate into the variable compression ratio engine, while its weight and cost become too high;
- a high force needs to be provided in order to keep the ball lifted when a high flow rate of oil is passing through the passage between said ball and its seat. When an electromagnetic suction cup is used as the means for lifting said ball, said force compromises the possibility of lifting said ball partially off its seat by varying the power of said suction cup by modulating the pulse width of the electric current with which the coil is supplied. Specifically, in such a case, the electrical powers required would cause an excessive increase in the temperature of said coil so that its life would no longer be compatible with that of the variable compression ratio engine;
- the screw-operated device is expensive and complex and its reliability difficult to assure. Further, this device does not allow the two balls each of which communicates with one chamber of the variable compression ratio engine control actuating cylinder to be lifted simultaneously even though lifting said balls simultaneously would make it possible to relieve the pressure on the control actuating cylinder when this cylinder tends to self-compress, something which is potentially necessary depending on the use made of the variable compression ratio engine.

It is in order to address various problems connected with the variable compression ratio engine ball-lift compression ratio adjusting devices as described in French patents FR 2 933 140 and FR 2 933 141 mentioned by way of reference while at the same time maintaining the key advantages thereof, that the tubular valve for controlling the compression ratio of a variable compression ratio engine proposes:

- a drastic reduction in the force that has to be produced by the electric lift means in order to allow oil to pass between the upper chamber and the lower chamber of the variable compression ratio engine control actuating cylinder so that said lift means can be made up of an electromagnetic suction cup or of a single-coil solenoid of small bulk rather than of a complex and costly screw-operated device;
- a drastic reduction in the force that has to be produced by the electric lift means in order to maintain the full or partial bore section for the passage of oil between the upper chamber and the lower chamber of the control actuating cylinder, the partial bore section being obtained for example by adjusting the power of the coil that said lifting means incorporate, it being possible for said power to be adjusted by pulse width modulation of the electric current supplied to said coil;
- a considerable restriction on the effect that strong variations in the pressure obtaining in the control actuating cylinder chambers have on the stability of the force that has to be supplied by the lift means in order to maintain the full or partial bore section for the passage of oil between the upper chamber and the lower chamber of the control actuating cylinder;
- to allow rapid variations in the variable compression ratio engine compression ratio over a limited angular range while at the same time allowing the piston of the control actuating cylinder to move over certain ranges of angular position of the crankshaft while at the same time preventing said piston from moving over other angular ranges of said crankshaft, this strategy being potentially useful for fine control over the compression ignition also known by the acronyms "CAI" or "HCCI";
- to combine into one and the same single compact device firstly the function of opening and of shutting off one of the ends of the transfer canal which connects the upper chamber and the upper chamber of the variable compression ratio engine control actuating cylinder and, secondly, the nonreturn valve function that ensures that hydraulic fluid is allowed to pass only in one direction when said device is shutting off one of the ends of said canal.

The tubular valve for adjusting the compression ratio of a variable compression ratio engine according the present invention comprises:

- at least one straight tube capable of a longitudinal translational movement in a valve casing comprising a low-pressure chamber placed in communication with a pressure accumulator by at least one duct, and a high-pressure chamber placed in communication with one or other of the upper or lower chambers of the control actuating cylinder by at least one duct, said straight tube comprising a first end opening into said low-pressure chamber and a second end opening into said high-pressure chamber, said second end being able to come into contact with at least one shut-off surface secured to said valve casing in such a way as to seal said second end as tightly as possible, said straight tube being kept in contact with the shut-off surface by at least one nonreturn and shut-off spring;
- sealing means for sealing between the external surface of said straight tube and the valve casing isolating the high-pressure chamber from the low-pressure chamber, said sealing means consisting of a nonreturn tube inside which the straight tube is held, the straight tube being capable of moving longitudinally in the nonreturn tube, while said nonreturn tube can move longitudinally with respect to the valve casing, said straight tube with said nonreturn tube creating a seal, said nonreturn tube comprising an end which is furthest from the shut-off surface of the straight tube which is kept in contact by the nonreturn and shut-off spring with a nonreturn seat formed in the valve casing so as to prevent the hydraulic fluid from passing from the high-pressure chamber to the low-pressure chamber, but allow said fluid to pass from the low-pressure chamber to the high-pressure chamber;

at least one electric actuator capable of applying to the straight tube a force that opposes that produced by the nonreturn and shut-off spring, said force being enough to separate the straight tube from the shut-off surface when electric current is passing through said actuator.

The tubular valve for adjusting the compression ratio of a variable compression ratio engine according to the present invention comprises a straight tube of which the second end is of truncated spherical shape and has a line of contact with the shut-off surface that is similar to the line formed by a ball resting on a seat.

The tubular valve for adjusting the compression ratio of a variable compression ratio engine according to the present invention comprises a straight tube which is connected to the electric actuator by a pull rod of which the attachment to said tube does not completely shut off said tube and leaves an axial and/or radial passage that allows the hydraulic fluid to flow along inside said tube.

The tubular valve for adjusting the compression ratio of a variable compression ratio engine according to the present invention comprises a pull rod of which the end terminates in a pull head of a diameter greater than a hole formed in a surface which seals the first end of the straight tube, said rod passing through said hole and said head being housed inside said tube, the latter comprising at least one radial and/or axial orifice opening into the low-pressure chamber.

The tubular valve for adjusting the compression ratio of a variable compression ratio engine according to the present invention comprises a pull rod of which the end terminates in a flat articulating head pierced with a hole through which a pin passes, the two ends of said pin being housed in holes formed radially in the straight tube near the first end of said tube.

The tubular valve for adjusting the compression ratio of a variable compression ratio engine according to the present invention comprises an electric actuator which is housed inside the low pressure chamber.

The tubular valve for adjusting the compression ratio of a variable compression ratio engine according to the present invention comprises an electric actuator which is housed outside the valve casing whereas the pull rod which connects it to the straight tube passes through the valve casing at the same time forming a seal therewith.

The tubular valve for adjusting the compression ratio of a variable compression ratio engine according to the present invention comprises a cross section of the straight tube at the seal said tube makes with the nonreturn tube which is smaller than the cross section of said straight tube where it makes contact with the shut-off surface.

The tubular valve for adjusting the compression ratio of a variable compression ratio engine according to the present invention comprises one end of the nonreturn tube which is kept in contact with the nonreturn seat and which is of truncated spherical shape and has a line of contact with said nonreturn seat that is similar to that produced by a ball resting on a seat.

The tubular valve for adjusting the compression ratio of a variable compression ratio engine according to the present invention comprises a nonreturn and shut-off spring which bears, at one end, against the straight tube near the second end thereof, and at the other end against the nonreturn tube near that one of its ends that is kept in contact with the nonreturn seat.

The tubular valve for adjusting the compression ratio of a variable compression ratio engine according to the present invention comprises an end stop is formed on the nonreturn tube and/or on the straight tube, said end stop limiting the maximum distance between the nonreturn tube and the nonreturn seat on the one hand, and in the same proportions limiting the maximum distance between the straight tube and the shut-off surface on the other.

The tubular valve for adjusting the compression ratio of a variable compression ratio engine according to the present invention comprises sealing means for sealing between the pull rod and the valve casing, which means consist of at least one annular seal and/or at least one piston ring.

The tubular valve for adjusting the compression ratio of a variable compression ratio engine according to the present invention comprises sealing means for sealing between the straight tube and the nonreturn tube which means consist of at least one annular seal and/or at least one piston ring.

The tubular valve for adjusting the compression ratio of a variable compression ratio engine according to the present invention comprises an electric actuator which consists of a coil of conducting wire which attracts a magnetic vane or core plunger when an electric current is passing through said coil.

The tubular valve for adjusting the compression ratio of a variable compression ratio engine according to the present invention comprises a core plunger which is attached directly to the straight tube.

The tubular valve for adjusting the compression ratio of a variable compression ratio engine according to the present invention comprises an electric actuator which consists of a rotary electric motor which is able to turn in one direction or the other a screw that is free to rotate with respect to the valve casing but fixed in terms of translational movement with respect to said casing, said screw being screwed directly or indirectly into the straight tube and said tube effecting a translational movement with respect to said casing when said screw is turned under the action of the rotary electric motor.

The tubular valve for adjusting the compression ratio of a variable compression ratio engine according to the present invention comprises a valve casing which is made up of at least one component exhibiting symmetry of revolution comprising inlet-outlet ducts fixed to a porting plate, said plate itself being attached to the crankcase of the variable compression ratio engine and said plate serving to support one or more tubular valves and comprising ducts that place said valves in communication with the upper and lower chambers of the double-acting hydraulic control actuating cylinder on the one hand, and with the pressure accumulator on the other.

The tubular valve for adjusting the compression ratio of a variable compression ratio engine according to the present invention comprises a porting plate which acts as valve casing to at least one tubular valve.

The tubular valve for adjusting the compression ratio of a variable compression ratio engine according to the present invention comprises an electric actuator which is fitted with at least one adjustable or non-adjustable valve end stop that limits the maximum linear translational travel of the straight tube.

The tubular valve for adjusting the compression ratio of a variable compression ratio engine according to the present invention comprises an electric actuator which is fitted with two adjustable or non-adjustable valve end stops, the first end stop limiting the distance between the straight tube and the shut-off surface to a small value, and the second end stop limiting the distance between said tube and said surface to a maximum value, travel beyond the first end stop being possible once the force produced by the electric actuator exceeds a certain force, whereas travel beyond the second end stop is never possible, whatever the force produced by said actuator.

The tubular valve for adjusting the compression ratio of a variable compression ratio engine according to the present invention comprises an electric actuator of which the second end stop consists of a preloaded spring which rests against a return end stop when the electric actuator is not producing enough force to separate said spring from said return end stop.

The tubular valve for adjusting the compression ratio of a variable compression ratio engine according to the present invention comprises a core plunger which is housed in the low-pressure chamber, whereas the coil is housed outside said chamber, and the magnetic field generated by said coil when an electric current is passing through it, passing through a coil sleeve secured to the valve casing so as to attract said core plunger.

The tubular valve for adjusting the compression ratio of a variable compression ratio engine according to the present invention comprises a shut-off surface secured to the valve casing and which is formed on the internal face of a shut-off plug screwed into said casing, said plug comprising at least one axial and/or radial orifice positioned at the external periphery of the region of contact between the straight tube and said shut-off surface, and said orifice directly or indirectly connecting the high-pressure chamber to one or other of the upper or lower chambers of the control actuating cylinder.

The tubular valve for adjusting the compression ratio of a variable compression ratio engine according to the present invention comprises a nonreturn seat which is formed on one of the faces of a nonreturn seat carrier of substantially cylindrical shape housed in the valve casing, said seat carrier being fitted with at least one duct and/or canal that allows the hydraulic fluid to pass from the low-pressure chamber to the high-pressure chamber when the nonreturn tube is not in contact with the nonreturn seat, and allowing said hydraulic fluid to pass from the high-pressure chamber to the low-pressure chamber when the straight tube is not in contact with the shut-off surface.

The tubular valve for adjusting the compression ratio of a variable compression ratio engine according to the present invention comprises a shut-off plug screwed into the valve casing which compresses the nonreturn seat carrier and/or the coil sleeve so that said plug constitutes the element that attaches said seat carrier and said coil sleeve to said valve casing.

The tubular valve for adjusting the compression ratio of a variable compression ratio engine according to the present invention comprises a component exhibiting symmetry of revolution and comprising inlet-outlet ducts which is screwed directly onto or into the crankcase of the variable compression ratio engine.

The tubular valve for adjusting the compression ratio of a variable compression ratio engine according to the present invention comprises a pull head which collaborates with a pull ball of a shape that complements that of the surface, said ball remaining pressed against said surface by a swivel joint spring which tends to move the straight tube away from the electric actuator.

The description which follows, with reference to the attached drawings, given by way of nonlimiting examples, will provide a better understanding of the invention, of the features it exhibits and of the advantages it is likely to afford:

DESCRIPTION OF THE INVENTION

FIGS. 1 to 10 show at least one tubular valve 400 for adjusting the compression ratio of a variable compression ratio engine comprising means of shutting off at least one duct connecting the upper chamber 121 and lower chamber 122 of a double-acting hydraulic control actuating cylinder 8.

Figure 9:
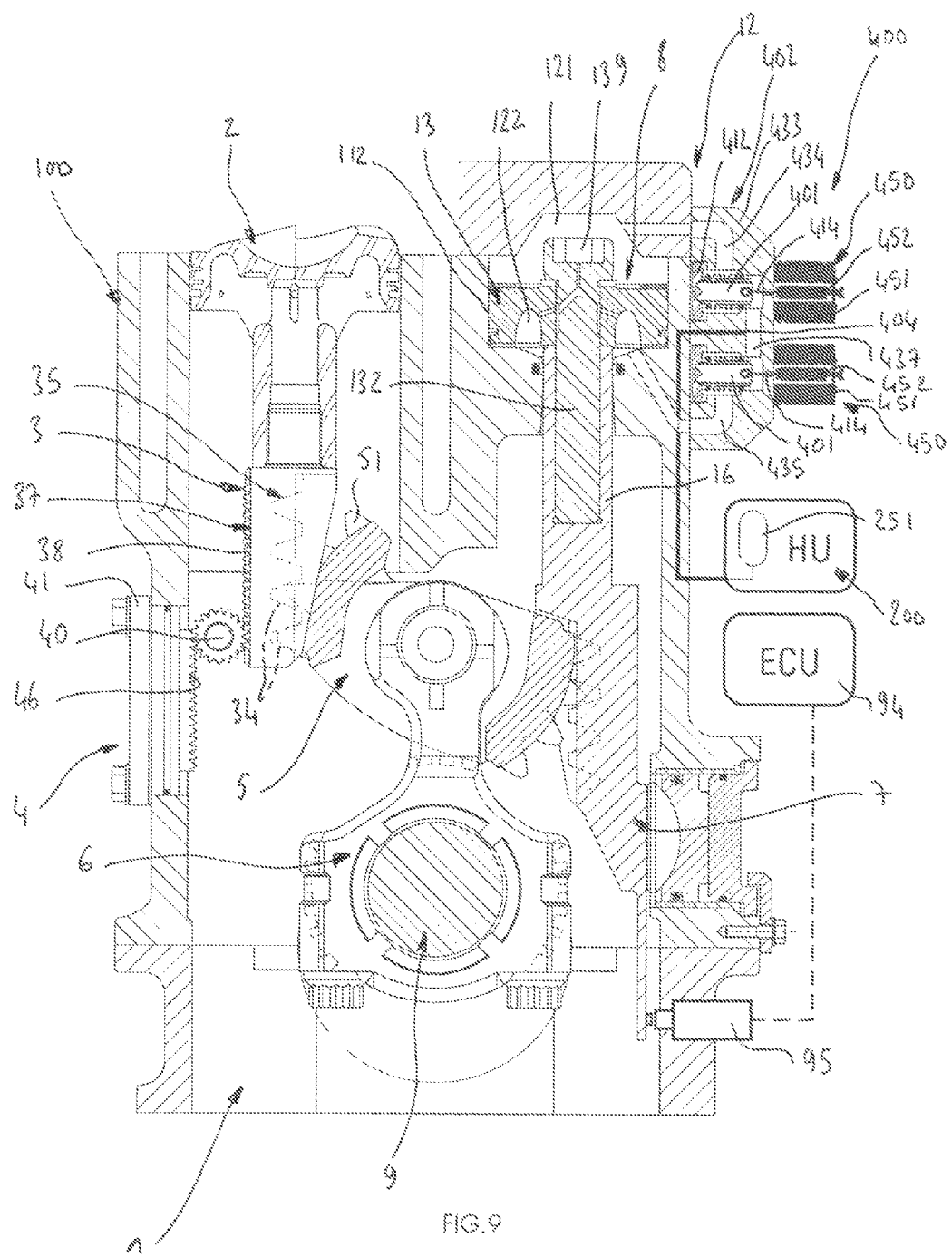
FIG. 9 is a schematic view in cross section illustrating the key components and their positions in a variable compression ratio engine of a tubular valve for adjusting the compression ratio of a variable compression ratio engine according to the present invention.
Figure 10:
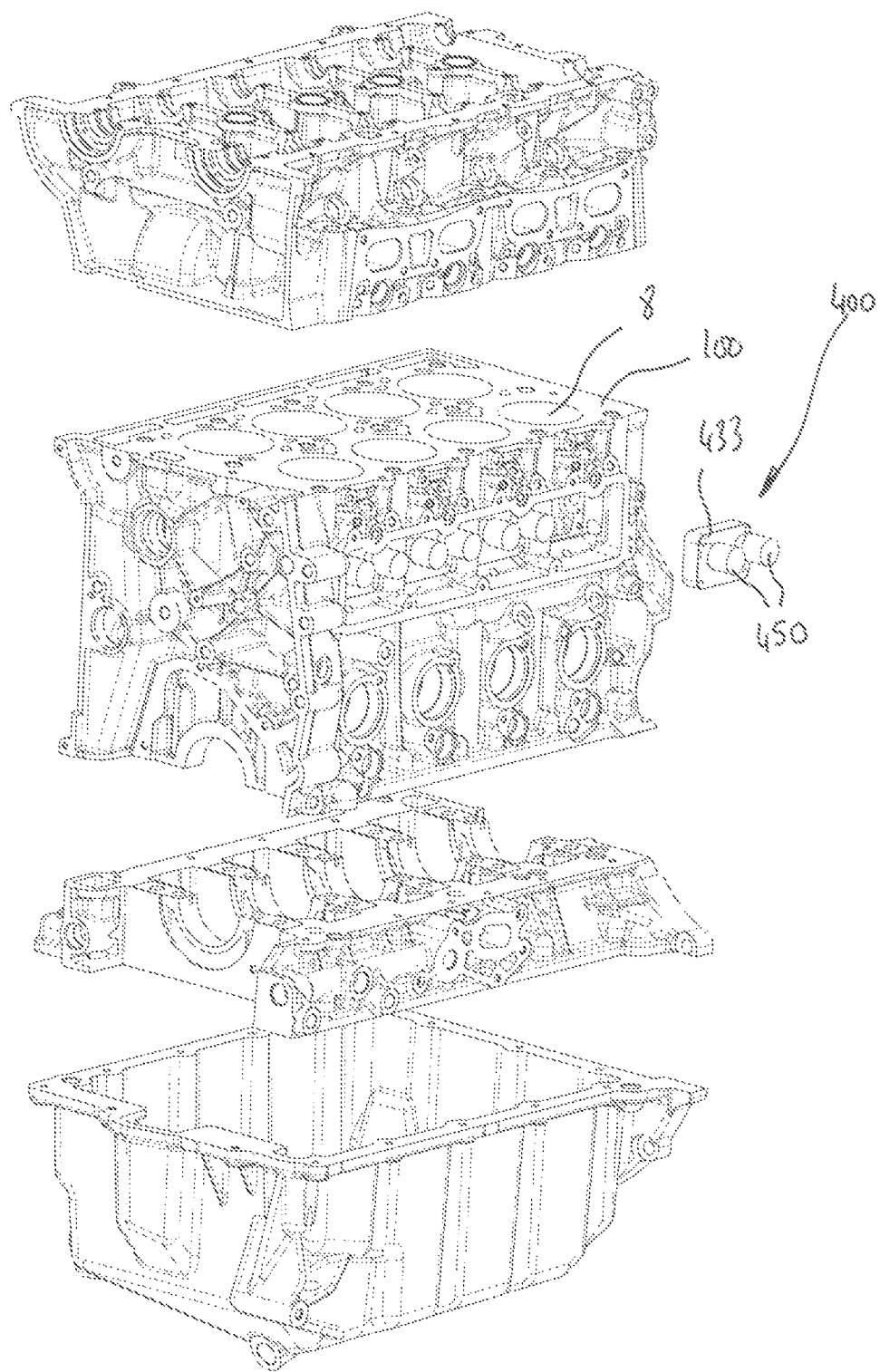
FIG. 10 is an exploded perspective view showing the engine block of the variable compression ratio engine and the position of a tubular valve for adjusting the compression ratio of a variable compression ratio engine according to the present invention on said engine block.

FIGS. 9 and 10 depict, according to patent applications and patents belonging to the applicant, the variable compression ratio engine which comprises a mechanical transmission device 1 comprising in the lower part of the combustion piston 2 a transmission member 3 known as a "piston rack" secured to said piston and collaborating firstly with a rolling guidance device 4 and secondly with a gearwheel 5.

The transmission member or piston rack 3 secured to the piston 2 is provided on one of its faces with a large-dimension first rack 35 of which the teeth 34 collaborate with those 51 of the gearwheel 5.

The transmission member or piston rack 3 comprises, on the opposite side to the first rack 35, a second rack 37 the small-sized teeth 38 of which collaborate with those of a roller 40 of the rolling guidance device 4.

The crankcase 100 is secured to a support 41 comprising the racks 46 that synchronize the movement of the roller 40 of the rolling guidance device 4 with that of the piston 2.

The gearwheel 5 collaborates with a connecting rod 6 connected to a crankshaft 9 in order to transmit motion between the combustion piston 2 and said crankshaft 9.

On the opposite side to the transmission member or piston rack 3, the gearwheel 5 collaborates with a control rack 7 of which the vertical position with respect to the crankcase 100 is controlled by a control device 12 comprising the double-acting hydraulic control actuating cylinder 8, and an actuating cylinder piston 13 which is guided in an actuating cylinder bore 112 formed in the crankcase 100.

The double-acting hydraulic control actuating cylinder 8 comprises, above the actuating cylinder piston 13, an upper actuating cylinder chamber 121 and, below the piston of said actuating cylinder 13, an actuating cylinder lower chamber 122, said chambers having different cylinder capacities from one another for the same stroke of the actuating cylinder piston 13.

The double-acting hydraulic control actuating cylinder is made up of a lower actuating cylinder rod 16 secured to the control rack 7 and of a clamping screw 132 provided with a tightening head 139 housed in the upper actuating cylinder chamber 121 and allowing the actuating cylinder piston 13 to be attached to said lower actuating cylinder rod 16 of the control rack 7.

The variable compression ratio engine may comprise at least one computer 94 and at least one position sensor 95 for measuring the vertical position of the control rack 7.

The variable compression ratio engine may comprise at least one sensor, not depicted, that detects the passage of the piston rack 3 in order from this to be able to deduce the compression ratio of said engine by taking account of the angular position of the crankshaft 9 at which passage of the piston rack 3 was detected.

FIGS. 1 to 10 depict the tubular valve 400 for adjusting the compression ratio according to the present invention which comprises at least one straight tube 401 capable of a longitudinal translational movement in a valve casing 402 comprising a low-pressure chamber 403 placed in communication with a pressure accumulator 251 by at least one duct 404, and a high-pressure chamber 405 placed in communication with one or other of the upper 121 or lower 122 chambers of the control actuating cylinder 8 by at least one duct 406.

The straight tube 401 comprises a first end 407 which opens into the low-pressure chamber 403 and a second end 408 which opens into said high-pressure chamber 405.

The straight tube 401 comprises a second end 408 which can come into contact with at least one shut-off surface 412 secured to said valve casing 402 so as to seal it as tightly as possible.

The second end 408 of the straight tube 401 is kept in contact with the shut-off surface 412 by at least one nonreturn and shut-off spring 427.

The second end 408 of the straight tube 401 is of truncated spherical shape and has a line of contact with the shut-off surface 412 which is similar to the line produced by a ball resting on a seat.

The tubular valve 400 for adjusting the compression ratio comprises sealing means 409 for sealing between the external surface of said straight tube 401 and the valve casing 402 isolating the high-pressure chamber 405 from the low-pressure chamber 403.

The sealing means 409 consist of a nonreturn tube 425 inside which the straight tube 401 is housed, it being possible for the straight tube 401 to move longitudinally in the nonreturn tube 425, whereas said nonreturn tube 425 can move longitudinally with respect to the valve casing 402.

The sealing means 409 for sealing between the straight tube 401 and the nonreturn tube 425 consist of at least one annular seal and/or at least one piston ring.

Thus, the straight tube 401 makes a seal with said nonreturn tube 425.

The nonreturn and tube 425 comprises one end 426 that forms a shut-off surface that is furthest from the shut-off surface 412 of the straight tube 401.

The shut-off surface 426 is kept in contact by the nonreturn and shut-off spring 427 with a nonreturn seat 428 formed in the valve casing 402 so as to prevent the hydraulic fluid from passing from the high-pressure chamber 405 to the low-pressure chamber 403, but allows said fluid to pass from the low-pressure chamber 403 to the high-pressure chamber 405.

It will be noted that complementary sealing means may be provided between the external surface of the straight tube 401 and the internal surface of the nonreturn tube 425, said means consisting of at least one annular seal and/or at least one piston ring, it being possible for example for said annular seal to be made up of two rings housed in one and the same groove, the first ring being made of a flexible material and housed in the bottom of said groove while the second ring is made of a material that is not as flexible but resistant to abrasion and which provides contact with the external surface of the straight tube 401 or the internal surface of the nonreturn tube 425.

The tubular valve 400 for adjusting the compression ratio comprises at least one electric actuator 450 capable of applying to the straight tube 401 a force that opposes that produced by the nonreturn and shut-off spring 427, said force being sufficient to separate the straight tube 401 from the shut-off surface 412 when electric current is passing through said actuator.

The straight tube 401 is connected to the electric actuator 450 by a pull rod 414 of which the attachment to said tube does not completely shut off said tube and leaves an axial and/or radial passage that allows the hydraulic fluid to flow along inside said tube.

Figure 8:
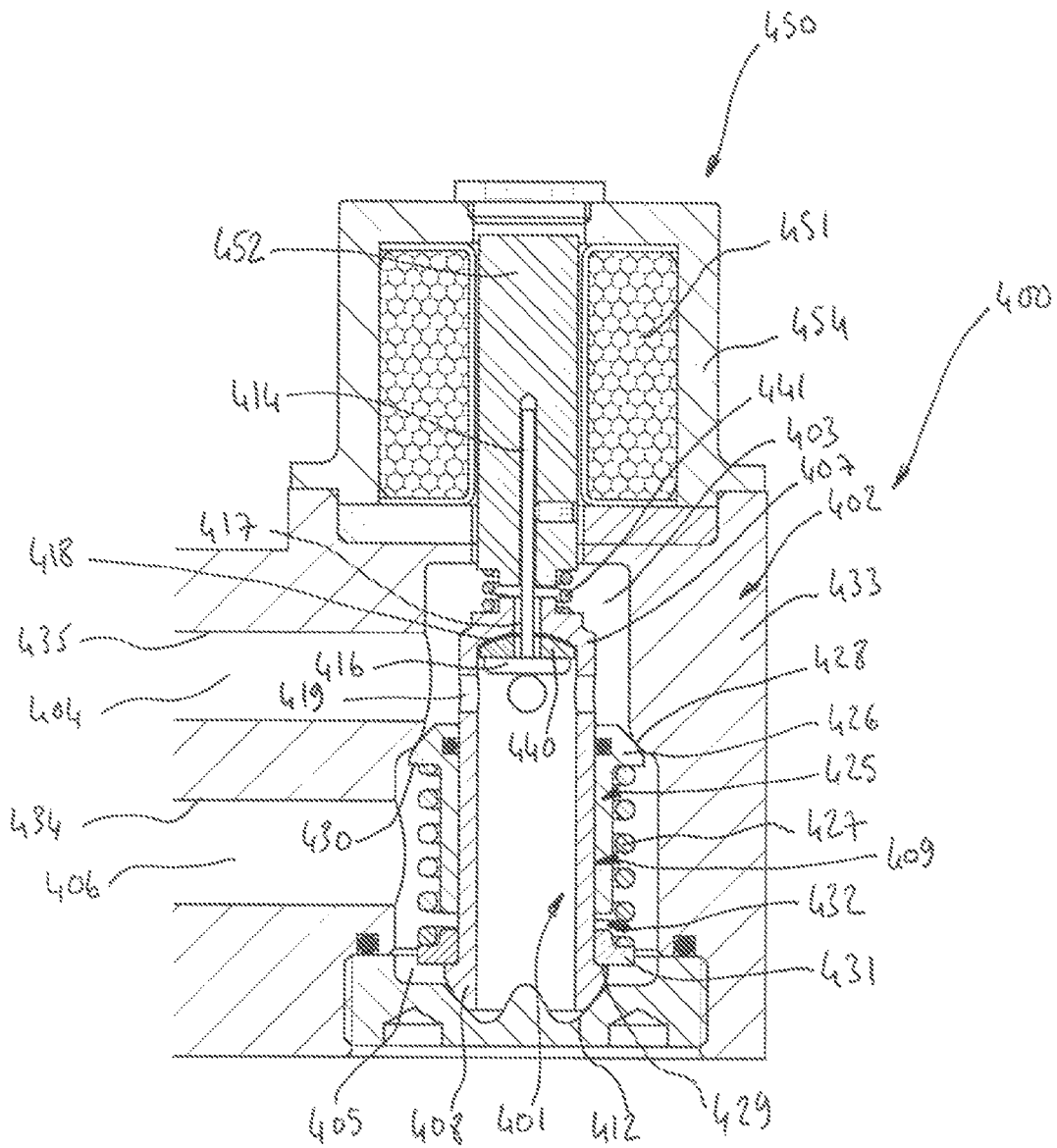

The end of the pull rod 414 terminates in a pull head 416 of a diameter greater than a hole 417 formed in a surface 418 which seals the first end 407 of the straight tube 401 (FIG. 8).

The pull rod 414 passes through the hole 417 whereas the head 416 is housed inside the tube 401, the latter having at least one radial and/or axial orifice 419 opening into the low-pressure chamber 403.

The tubular valve 400 for adjusting the compression ratio comprises sealing means for sealing between the pull rod 414 and the valve casing 402 which means consist of at least one annular seal and/or at least one piston ring.

Figure 6:
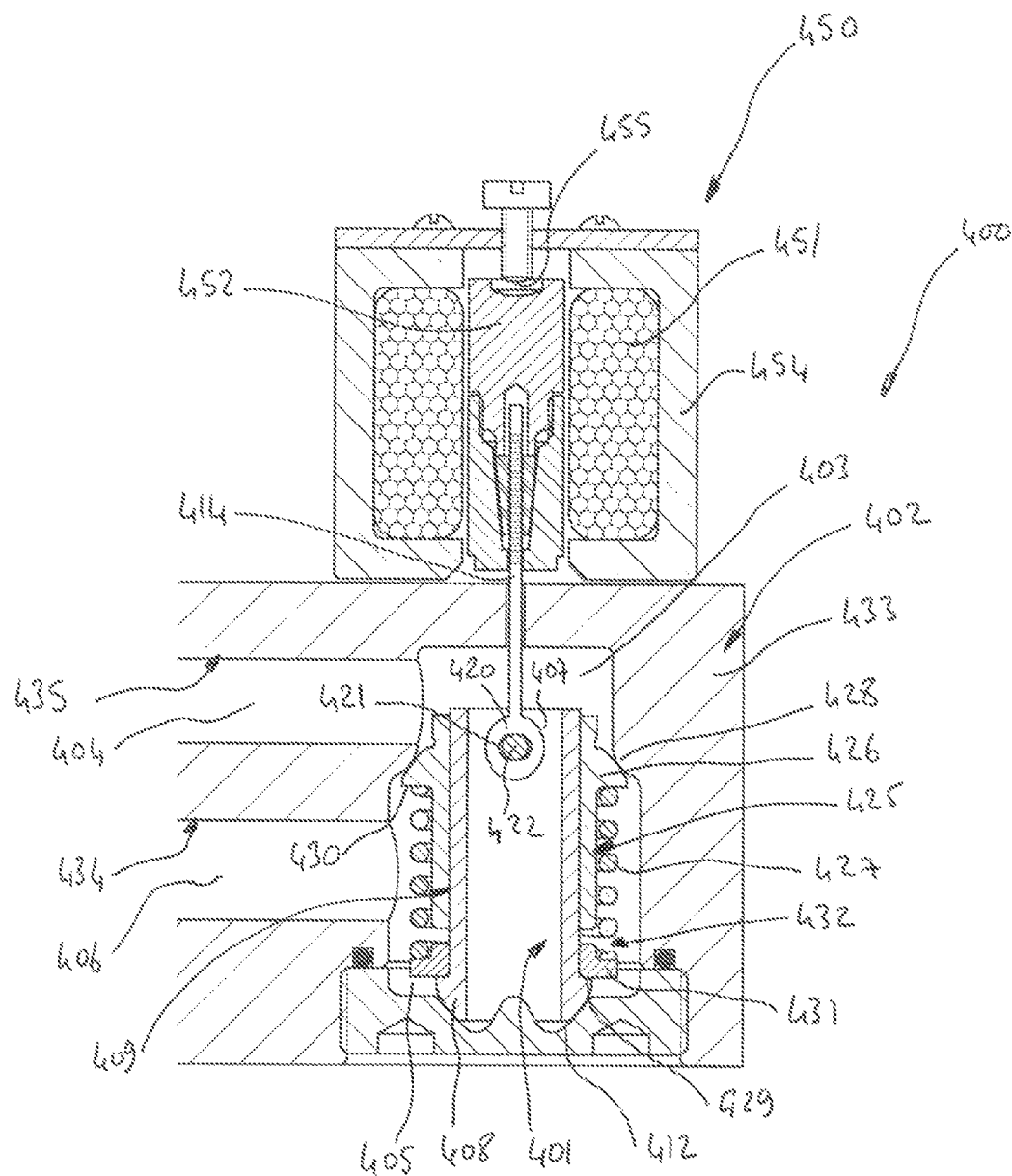
FIGS. 6 to 8 are schematic views in cross section depicting alternative forms of embodiment of the tubular valve for adjusting the compression ratio of a variable compression ratio engine according to the present invention, of which the electric actuator is connected to the straight tube by a pull rod.
Figure 7:
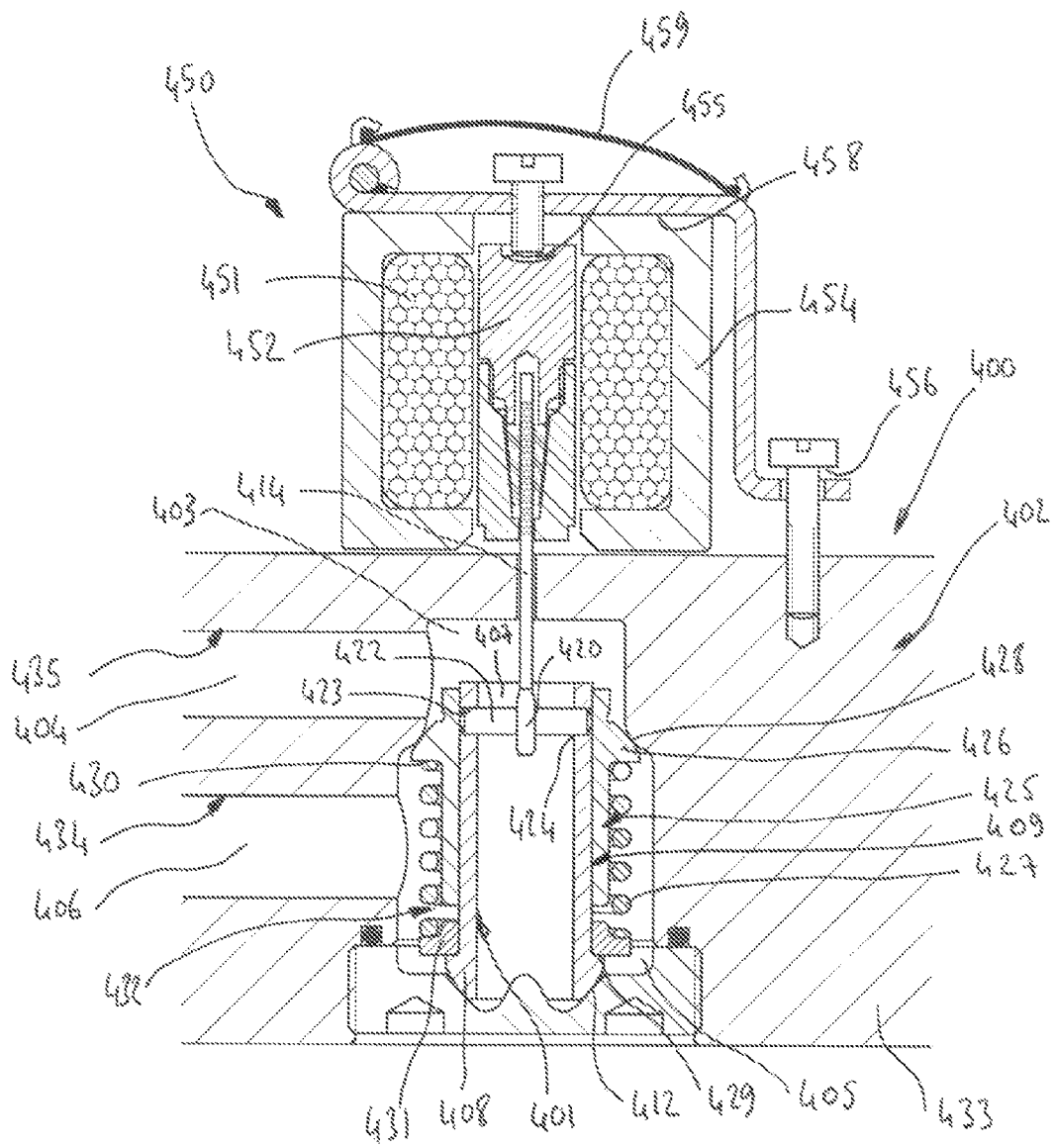

FIGS. 6 and 7 depict an alternative form of the end of the pull rod 414 which may terminate in a flat articulating head 420 pierced with a hole 421 through which a pin 422 passes, the two ends of said pin 422 being housed in holes 423, 424 formed radially in the straight tube 401 near the first end 407 of said tube.

The tubular valve 400 for adjusting the compression ratio comprises an electric actuator 450 which is housed inside the low pressure chamber 403.

The tubular valve 400 for adjusting the compression ratio comprises an electric actuator 450 which is housed outside the valve casing 402 whereas the pull rod 414 which connects it to the straight tube 401 passes through the valve casing 402 at the same time forming a seal therewith.

It will be noted that the cross section of the straight tube 401 at the seal that said tube makes with the nonreturn tube 425 is smaller than the cross section of said straight tube 401 where it makes contact with the shut-off surface 412.

This difference in cross section means that when the pressure obtaining in the high-pressure chamber 405 is greater than the pressure obtaining in the low-pressure chamber 403, a force can be supplied which combines with the force produced by the nonreturn and shut-off spring 427 to increase the pressure of contact between the second end 408 and the straight tube 401 and the shut-off surface 412, or to prevent any undesired separation between said tube and said surface.

It will be noted that the end 426 forming the shut-off surface of the nonreturn tube 425 which is kept in contact with the nonreturn seat 428 is of truncated spherical shape and has a line of contact with said nonreturn seat 428 similar to that produced by a ball resting against a seat.

The nonreturn and shut-off spring 427 bears, at one end, against the straight tube 401 near the second end 408 thereof, and at the other end against the nonreturn tube 425 near that one 426 of its ends that is kept in contact with the nonreturn seat 428.

With this configuration, each of the ends of the nonreturn and shut-off spring 427 can bear against a shoulder 429, 430 produced at the periphery of the straight tube 401 and of the nonreturn tube 425. According to one particular embodiment, each shoulder 429, 430 can be widened using a washer 431.

It will be noted that an end stop 432 is formed on the nonreturn tube 425 and/or on the straight tube 401, said end stop limiting the maximum distance between the nonreturn tube 425 and the nonreturn seat 428 on the one hand, and in the same proportions limiting the maximum distance between the straight tube 401 and the shut-off surface 412 on the other.

According to one particular embodiment, said end stop 432 may consist of a protrusion or shoulder created near the second end 408 of the straight tube 401 and against which the end of the nonreturn tube 425 furthest from the nonreturn seat 428 butts.

The electric actuator 450 consists of a coil 451 of conducting wire which attracts a magnetic vane or core plunger 452 when an electric current is passing through said coil.

The magnetic vane or core plunger 452 is attached directly to the straight tube 401 either by screwing, crimping, bonding or by any other means of attachment known to those skilled in the art.

It will be noted that according to a first particular embodiment, the amount of current passing through said coil 451 can be controlled by pulse width modulation.

According to a second particular embodiment that can be combined with the first, the charge of a capacitor that has previously accumulated current can be transferred to said coil 451 by switching of a transistor. This configuration allows a great deal of power to be transferred to the electric actuator 450 over a brief duration.

According to this second embodiment, the capacitor and the transistor are positioned near the coil 451 in order to limit the length of cable needed for transferring charge from said capacitor to said coil.

The electric actuator 450 consists of a rotary electric motor which is able to turn in one direction or the other a screw that is free to rotate with respect to the valve casing 402 but fixed in terms of translational movement with respect to said casing, said screw being screwed directly or indirectly into the straight tube 401 and said tube effecting a translational movement with respect to said casing when said screw is turned under the action of the rotary electric motor.

The valve casing 402 is made up of at least one component exhibiting symmetry of revolution comprising inlet-outlet ducts fixed to a porting plate 433, said plate 433 itself being attached to the crankcase 100 of the variable compression ratio engine.

The porting plate 433 may act as support for one or more tubular valves 400 for adjusting the compression ratio and comprise ducts 434, 435 placing said valves in communication with the upper 121 and lower 122 chambers of the double-acting hydraulic control actuating cylinder 8 on the one hand, and with the pressure accumulator 251 on the other (FIG. 9).

The porting plate 433 acts as valve casing 402 to at least one tubular valve 400 for adjusting the compression ratio.

The electric actuator 450 is fitted with at least one adjustable or non-adjustable valve end stop 455 that limits the maximum linear translational travel of the straight tube 401 (FIG. 6).

FIG. 7 shows that the electric actuator 450 may be fitted with two adjustable or non-adjustable valve end stops 455, 456, the first end stop 455 limiting the distance between the straight tube 401 and the shut-off surface 412 to a small value, and the second end stop 456 limiting the distance between said tube 401 and said surface to a maximum value, travel beyond the first end stop 455 being possible once the force produced by the electric actuator 450 exceeds a certain force, whereas travel beyond the second end stop 456 is never possible, whatever the force produced by said actuator.

The second valve end stop 456 of the electric actuator 450 consists of a preloaded spring 459 which rests against a return end stop 458 when the electric actuator 450 is not producing enough force to separate said spring 459 from said return end stop 458.

According to one particular embodiment, the preloaded spring 459 may consist of a steel leaf, a metal ring or any other means that offers a great deal of resistance when resting against its return end stop 458 and a lesser resistance when the distance between the straight tube 401 and the shut-off surface 412 is at its maximum.

FIGS. 1 to 5 depict the fact that the core plunger 452 is housed in the low-pressure chamber 403 whereas the coil 451 is housed outside said chamber 403.

Thus, the magnetic field generated by said coil 451 when electric current is passing through it, passes through a coil sleeve 454 secured to the valve casing 402 so as to attract said core plunger 452.

The shut-off surface 412 secured to the valve casing 402 is formed on the internal face of a shut-off plug 457 screwed into said casing 402.

The shut-off plug 457 comprises at least one axial and/or radial orifice 460 positioned at the external periphery of the region of contact between the straight tube 401 and said shut-off surface 412, and said orifice 460 directly or indirectly connecting the high-pressure chamber 405 to one or other of the upper 121 or lower 122 chambers of the control actuating cylinder 8.

The nonreturn seat 428 is formed on one of the faces of a nonreturn seat carrier 461 of substantially cylindrical shape housed in the valve casing 402.

The seat carrier 461 is fitted with at least one duct and/or canal 462 that allows the hydraulic fluid to pass from the low-pressure chamber 403 to the high-pressure chamber 405 when the nonreturn tube 425 is not in contact with the nonreturn seat 428, and allowing said hydraulic fluid to pass from the high-pressure chamber 405 to the low-pressure chamber 403 when the straight tube 401 is not in contact with the shut-off surface 412.

The shut-off plug 457 screwed into the valve casing 402 compresses the nonreturn seat carrier 461 and/or the coil sleeve 454 so that said plug 457 constitutes the element that attaches said seat carrier 461 and said coil sleeve 454 to said valve casing 402.

With this configuration and in any variants thereof, seals can seal the various components relative to one another and/or create a seal between said components and the valve casing 402.

The component exhibiting symmetry of revolution and comprising inlet-outlet ducts is screwed directly onto or into the crankcase 100 of the variable compression ratio engine or attached to said casing by any mechanical attachment or connection known to those skilled in the art.

The pull head 416 collaborates with a pull ball 440 of a shape that complements that of the surface 418, said ball remaining pressed against said surface by a swivel joint spring 441 which tends to move the straight tube 401 away from the electric actuator 450.

Operation:

According to one particular embodiment, the way in which the tubular valve 400 for adjusting the compression ratio of a variable compression ratio engine works is as follows:

As illustrated in FIG. 9, when the variable compression ratio engine is to remain at a given compression ratio, the second end 408 of the two straight tubes 401 of each tubular valve 400 which respectively allow the hydraulic fluid to pass from the upper chamber 121 to the lower chamber 122 of the control actuating cylinder 8 and vice versa each remain in contact with their respective shut-off surface 412.

When this happens, said fluid can move neither from the upper chamber 121 to the lower chamber 122 nor in the opposite direction, and this means that the position of the control rack 7 of said engine is kept at a determined value and the compression ratio of said engine is kept fixed.

Bearing in mind the conditions of operation of the variable compression ratio engine, it is regularly necessary to adapt the compression ratio thereof.

According to circumstances, this variation in the compression ratio of said engine serves to maximize the performance or efficiency of said engine or alternatively to improve the operation of the three-way catalytic converter.

If, bearing in mind these various requirements, the computer (ECU) 94 of the variable compression ratio engine needs to increase the compression ratio of said engine, it sends an electric current to the electric actuator 450 connected to the straight tube 401 of the lower chamber 122 of the control actuating cylinder 8, and this has the effect of moving said tube 401 away from its shut-off surface 412, said actuator 450 acting on said tube 401 through the agency of its pull rod 414.

Figure 3:
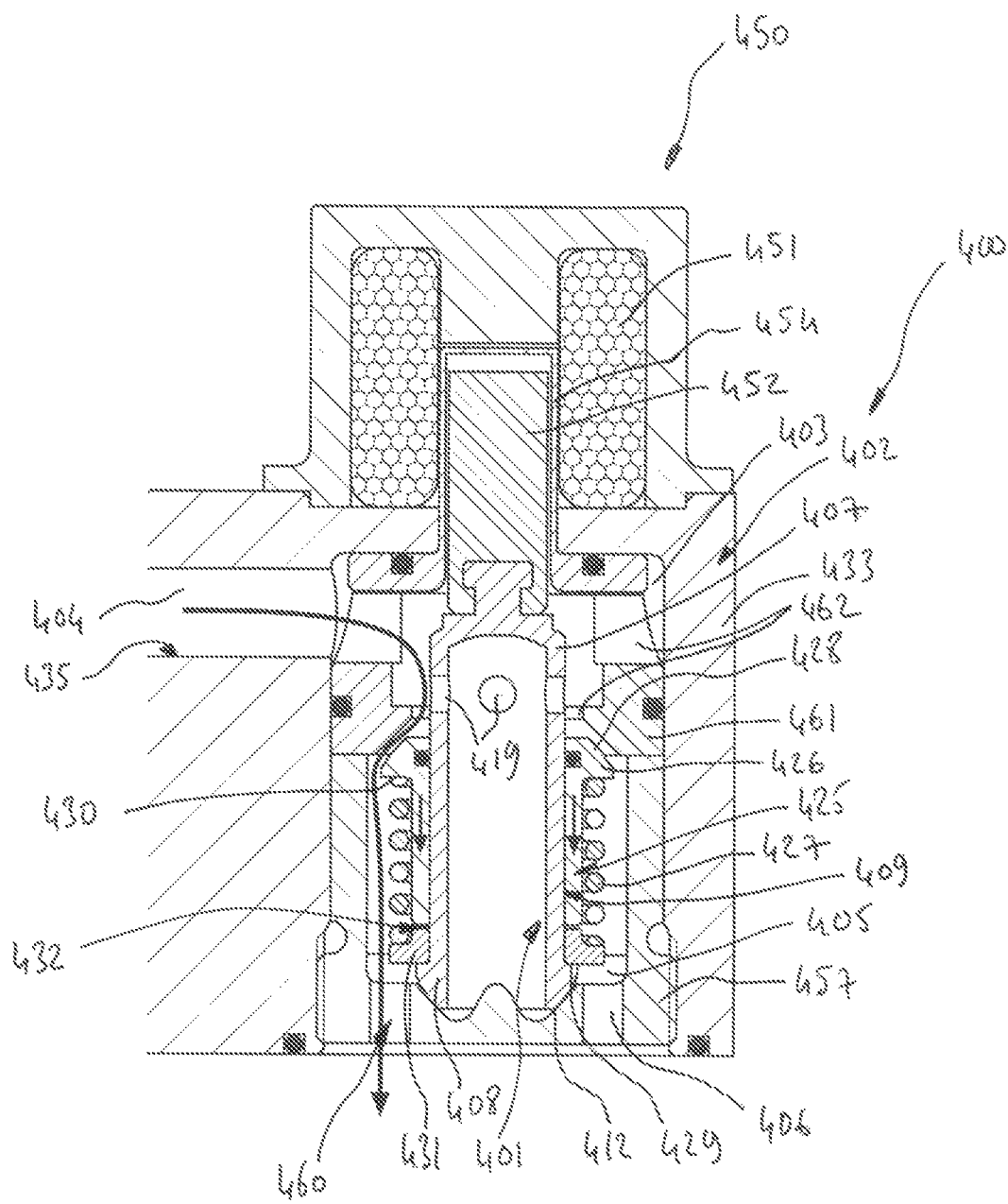
Figure 4:
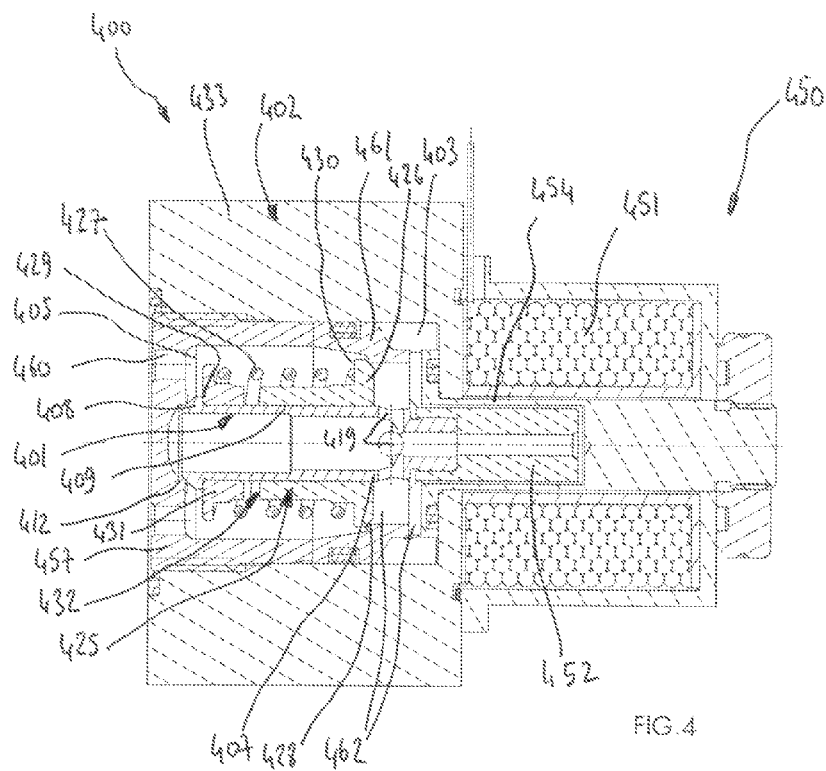
Figure 5:
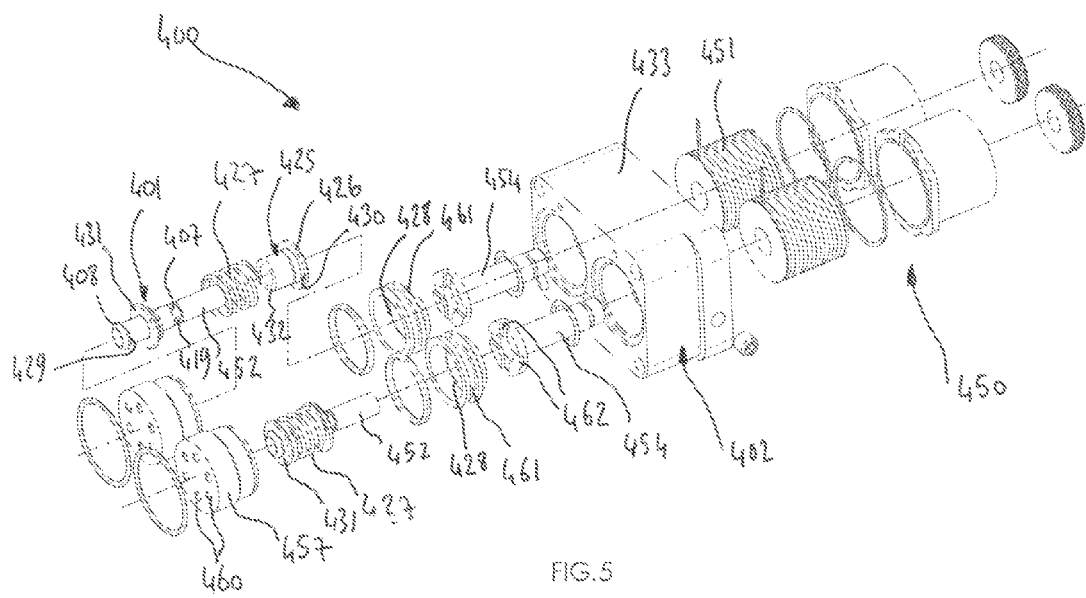
FIG. 5 is an exploded perspective view illustrating the first embodiment of the tubular valve for adjusting the compression ratio of a variable compression ratio engine according to the present invention.

Thus moved away from its shut-off surface 412, said straight tube 401 allows the hydraulic fluid to leave the lower actuating cylinder chamber 122 and enter the upper actuating cylinder chamber 121 via the transfer canal 437, the nonreturn tube 425 of the upper actuating cylinder chamber 121 itself allowing the hydraulic fluid to enter said upper chamber 121 but not allowing it to reemerge therefrom, because of its nonreturn effect (FIG. 3).

As can be seen in FIG. 9 that illustrates the present invention, no hydraulic pump is needed to cause the control rack 7 of the variable compression ratio engine to move.

This is because this movement is in fact produced by the alternating forces imparted to said control rack 7 by the pressure of the gases contained in the combustion chamber of the engine and/or by the forces resulting from the inertia of the key moving parts of said engine which are the gearwheel 5, the combustion piston 2 and the piston rack 3 and its rolling guidance device 4.

As can easily be deduced from studying FIG. 9, the movement of the control rack 7 toward the lower actuating cylinder chamber 122 causes an increase in volume of the upper actuating cylinder chamber 121 which increase in volume is greater than the decrease in volume of said lower chamber.

This is the result of the absence of a control actuating cylinder upper rod 8. As a result, the pressure in the actuating cylinder upper chamber 121 decreases when the control rack 7 moves toward the lower actuating cylinder chamber 122. The replenishing of said upper actuating cylinder chamber 121 with hydraulic fluid is then performed from the fluid stored in the pressure accumulator 251 that the hydraulic unit 200 of the variable compression ratio engine comprises.

Conversely, when the computer (ECU) 94 of the variable compression ratio engine needs to lower the compression ratio of said engine, it sends an electric current to the electric actuator 450 connected to the straight tube 401 of the upper chamber 121 of the control actuating cylinder 8, and this has the effect of moving said tube 401 away from its shut-off surface 412, said actuator 450 acting on said tube 401 through the agency of its pull rod 414.

Thus moved away from its shut-off surface 412, said straight tube 401 allows the hydraulic fluid to leave the upper actuating cylinder chamber 121 and enter the lower actuating cylinder chamber 122 via the transfer canal 437. In this instance, the nonreturn tube 425 of the lower actuating cylinder chamber 122 allows the hydraulic fluid to enter said chamber but does not allow it to reemerge therefrom, because of the nonreturn effect of said tube 425.

As can easily be deduced from FIG. 9, the movement of the control rack 7 toward the upper actuating cylinder chamber 121 leads to an increase in volume of the lower actuating cylinder chamber 122 which increase is smaller than the reduction in volume of the upper actuating cylinder chamber 121, because of the absence of an actuating cylinder upper rod.

As a result, the total volume of hydraulic fluid contained in the two actuating cylinder chambers 121, 122 of the control actuating cylinder 8 decreases. This means that some of the volume of fluid expelled by the upper actuating cylinder chamber 121 is fed back into the lower actuating cylinder chamber 122 via the transfer canal 437, whereas the remaining portion is fed back to the pressure accumulator 251 that the hydraulic unit 200 of the variable compression ratio engine comprises.

It will be noted that the volume of hydraulic fluid returned to said pressure accumulator 251 is approximately equal to the difference between the volume of the upper actuating cylinder chamber 121 swept by the actuating cylinder piston 13 and the volume of the lower actuating cylinder chamber 122 swept at the same time by said piston 13 during the movement operation performed by said piston 13, said operation being aimed at lowering the compression ratio of the variable compression ratio engine.

Figure 2:
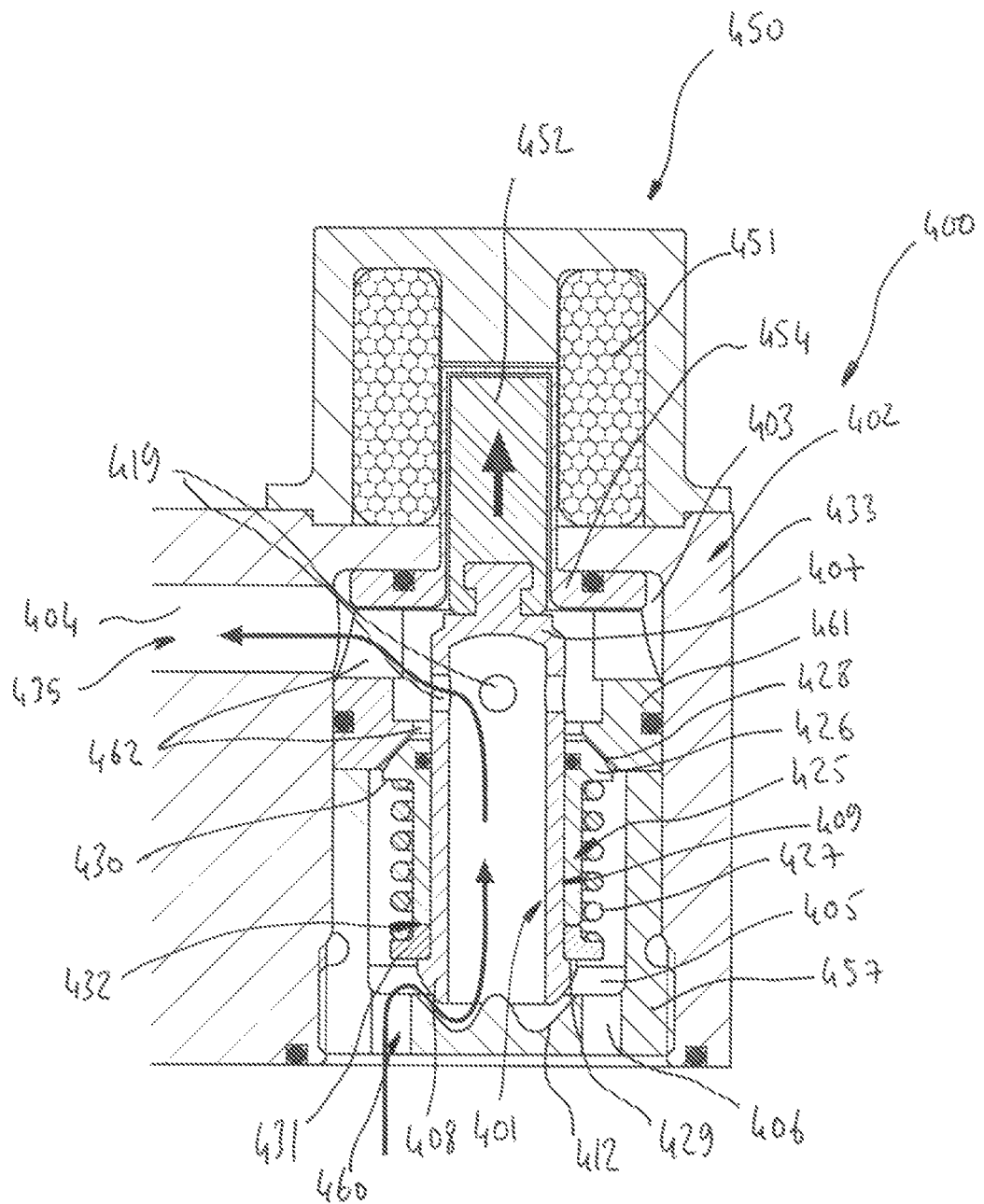

As will have been observed, under the combined action of the straight tubes 401, of the nonreturn tubes 425 and of the reciprocating forces applied to the control rack 7 by the moving linkage of the variable compression ratio engine, the control actuating cylinder 8 behaves like a nonreturn pawl, it being possible for said rack 7 to move in the direction of the chamber of which the straight tube 401 is kept away from its shut-off surface 412 by its electric actuator 450, as illustrated in FIG. 2, but not in the opposite direction.

Whether the operation is one aimed at increasing the compression ratio of the variable compression ratio engine or some other operation aimed at lowering it, the moment at which the corresponding straight tube 401, kept away from its shut-off surface 412 by its electric actuator 450, needs to be brought back into contact with said surface, is determined by the computer (ECU) 94 of the variable compression ratio engine.

Said moment is deduced by said computer (ECU) 94 from the position of the control rack 7, said position being fed back to it by a position sensor 95 with which it collaborates, said sensor 95 constantly measuring the vertical position of said rack 7.

Figure 1:
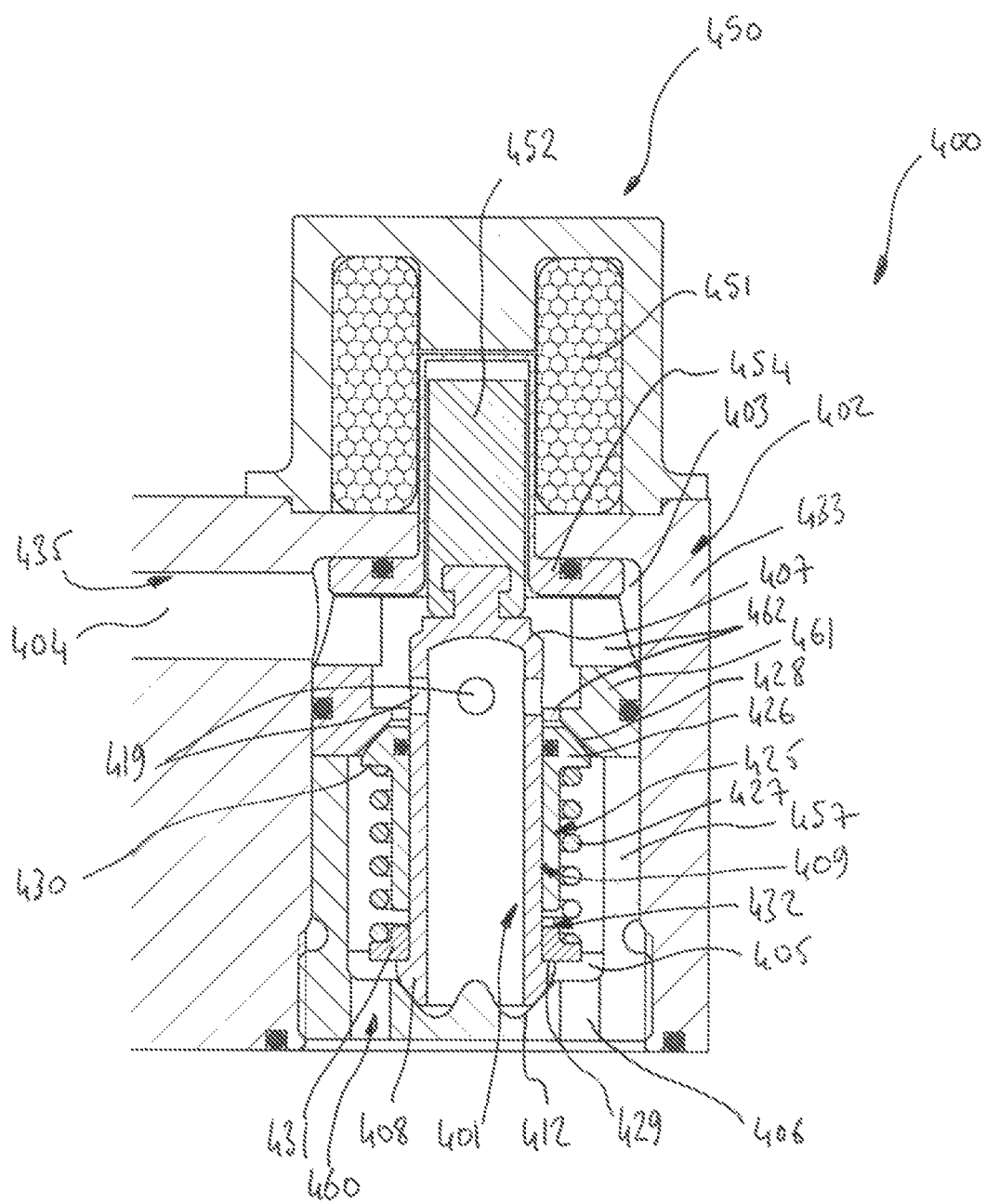
FIGS. 1 to 4 are schematic views in cross section showing a first embodiment of a tubular valve for adjusting the compression ratio of a variable compression ratio engine according to the present invention comprising an electric actuator the core plunger of which is attached directly to a straight tube.

Thus informed, the computer (ECU) 94 can bring the straight tube 401 back into contact with its shut-off surface 412 when said control rack 7 has reached the position corresponding to the desired compression ratio (FIG. 1).

Collaboration between the computer (ECU) 94 and the position sensor 95 of the control rack 7 also allows compensation for any undesired drift in the position of said rack 7. Said drift may be the result of various leaks, whether these be leaks between the upper actuating cylinder chamber 121 and lower actuating cylinder chamber 122 resulting from a lack of sealing of the actuating cylinder piston seal 13 or whether these be leaks between either one of said actuating cylinder chambers 121, 122 and the outside of the control actuating cylinder 8.

To compensate for said drift, the computer (ECU) 94 can order a temporary separation between the straight tube 401 and its shut-off surface 412 of the opposite chamber to the direction of the drift of said control rack 7, until said rack 7 returns to the desired position.

When a leak occurs between either one of the upper 121 or lower 122 actuating cylinder chambers and the outside of said control actuating cylinder 8, said actuating cylinder 8 is replenished with hydraulic fluid by the pressure accumulator 251 of the hydraulic unit 200 via the nonreturn tube 425 of the opposing chamber to the leaky chamber, whereas the straight tube 401 of the sealed chamber is kept partially and/or cyclically away from its shut-off surface 412 so that an opposing leak aimed at keeping the control rack 7 in a position consistent with its datum position as determined by the computer (ECU) 94 is generated.

If the upper 121 and lower 122 actuating cylinder chambers are both leaky, the computer (ECU) 94 observes the direction and rate of drift of the control rack 7 and moves the straight tube 401 of the actuating cylinder chamber 121 or 122 placed in the opposite direction to the direction of the drift correspondingly away from its shut-off surface 412, the latter strategy also allowing the control rack 7 to be kept in a position consistent with the datum as determined by the computer (ECU) 94.

According to one particular embodiment of the tubular valve 400 for adjusting the compression ratio according to the invention, the angular position of the crankshaft 9 of the variable compression ratio engine can be taken into consideration by the computer (ECU) 94 during the operations of moving the control rack 7.

With this mode of managing said engine using the computer (ECU) 94, movement of the control rack 7 is permitted only over certain ranges of angular position of the crankshaft 9, whereas it is forbidden in other ranges.

This control strategy makes it possible for example for said control rack 7 to be operated only during the power and exhaust strokes of the variable compression ratio engine while preventing said rack 7 from being moved during the intake and compression strokes.

For example, said strategy allows the preparation of the air-fuel mixture for the cycle to be adapted precisely to suit the actual compression ratio that will follow said preparation, making it possible, for example, to ensure that auto-ignition of said mixture will indeed begin at the desired moment.

Whichever actuating cylinder chamber 121, 122 is considered, the fact that the computer (ECU) 94 takes the instantaneous angular position of the crankshaft 9 into consideration also allows said computer (ECU) 94 to exert finer control over the distance between the straight tube 401 and its shut-off surface 412 when said distance is deliberately small, and is adjusted by adapting the power of the coil 451 of the electric actuator 450 by pulse width modulation of the current supplied to said coil.

In this case, the difference in pressure between the upstream and downstream ends of the straight tube 401 varies cyclically, and this has the effect of assisting with or countering the force generated by the electric actuator 450. This cyclic variation in the differential pressure between upstream and downstream can be prerecorded in the memory of the computer (ECU) 94 for each angular position of the crankshaft 9 and for each operating point of the variable compression ratio engine.

These prerecorded values allow the computer (ECU) 94 to modulate the pulse width of the current supplied to said coil 451 and therefore the power of this coil to suit the current angular position of said crankshaft 9 and to take account of the operating point of the engine so as to obtain the most stable possible distance between the straight tube 401 and its shut-off surface 412 and, in any event, prevent any hunting of said straight tube 401 in its longitudinal movement.

Aside from taking into consideration the angular position of the crankshaft 9 of the variable compression ratio engine, the computer (ECU) 94 can also take account of the viscosity of the hydraulic fluid. Thus, the distance between the straight tube 401 and its shut-off surface 412 and the time for which this distance is maintained can be corrected by the computer (ECU) 94 as a function of said viscosity so as to increase the precision with which the control rack 7 is positioned.

Said viscosity may notably be deduced by the computer (ECU) 94 from the temperature of said fluid, said temperature being fed back to said computer (ECU) 94 by a sensor.

It will be noted that, according to a particular embodiment illustrated in FIG. 7, the electric actuator 450 of the tubular valve 400 for adjusting the compression ratio according to the invention may comprise two end stops 455, 456 which establish a mechanical link between the distance between the straight tube 401 and its shut-off surface 412, and the pulling power delivered by said actuator 450.

When a low electrical power is applied to the terminals of the electric actuator 450, the distance between the straight tube 401 and its shut-off surface 412 is kept at a low value by the first end stop 455. Once a certain electrical power applied to the terminals of the electric actuator 450 has been exceeded, the second end stop 456 can be reached but never passed.

This second end stop 456 defines the maximum authorized distance between the straight tube 401 and its shut-off surface 412. To obtain this result, the first end stop 455, is kept, for example, a certain distance from the shut-off surface 412 by a preloaded spring 459 or by any other locking system not depicted.

Said locking system is itself pressed for example against the uncrossable end stop 458 which defines its minimum distance away from the shut-off surface 412.

It will be noticed that for a given force applied to the control rack 7, the maximum distance between the straight tube 401 and its shut-off surface 412 makes it possible to obtain a high speed of travel for said rack 7, whereas the small distance between straight tube 401 and its shut-off surface 412 makes it possible to obtain a low speed of travel for said control rack 7.

Said high speed allows a rapid transition from an actuating cylinder piston 13 position away from the datum position to another position close to said datum position, whereas the low speed allows the transition from said position near said datum position into said datum position.

Said low speed can also be used to compensate for the slow drift in the position of the control rack 7 caused by possible hydraulic leaks or for a transition from one datum position to another datum position when said positions are close to one another.

It must also be understood that the foregoing description has been given solely by way of example and that it does not in any way restrict the field of the invention and that replacing the embodiment details described by any other equivalent details would not constitute a departure from that field.

The invention claimed is:

1. A tubular valve for adjusting the compression ratio of a variable compression ratio engine comprising a crankcase (100) accommodating a double-acting hydraulic control actuating cylinder (8) which comprises an upper chamber (121) and a lower chamber (122), both filled with a hydraulic fluid, and at least one actuating cylinder piston (13) connected to a control rack (7), said tubular valve comprising:

at least one straight tube (401) capable of a longitudinal translational movement in a valve casing (402) comprising a low-pressure chamber (403) placed in communication with a pressure accumulator (251) by at least one duct (404), and a high-pressure chamber (405) placed in communication with one or other of the upper (121) or lower (122) chambers of the control actuating cylinder (8) by at least one duct (406), said at least one straight tube (401) comprising a first end (407) opening into said low-pressure chamber (403) and a second end (408) opening into said high-pressure chamber (405), said second end (408) being able to come into contact with at least one shut-off surface (412) secured to said valve casing (402) in such a way as to seal said second end as tightly as possible, said at least one straight tube (401) being kept in contact with the at least one shut-off surface (412) by at least one nonreturn and shut-off spring (427);

sealing means (409) for sealing between the external surface of said at least one straight tube (401) and the valve casing (402) isolating the high-pressure chamber (405) from the low-pressure chamber (403), said sealing means (409) consisting of a nonreturn tube (425) inside which the at least one straight tube (401) is held, the at least one straight tube (401) being capable of moving longitudinally in the nonreturn tube (425), while said nonreturn tube (425) can move longitudinally with respect to the valve casing (402), said at least one straight tube (401) with said nonreturn tube (425) creating a seal, said nonreturn tube (425) comprising a first end (426) which is furthest from the at least one shut-off surface (412) of the at least one straight tube (401) which is kept in contact by the at least one nonreturn and shut-off spring (427) with a nonreturn seat (428) formed in the valve casing (402) so as to prevent the hydraulic fluid from passing from the high-pressure chamber (405) to the low-pressure chamber (403), but allow said hydraulic fluid to pass from the low-pressure chamber (403) to the high-pressure chamber (405); and at least one electric actuator (450) capable of applying to the at least one straight tube (401) a force that opposes that produced by the at least one nonreturn and shut-off spring (427), said force being enough to separate the at least one straight tube (401) from the at least one shut-off surface (412) when electric current is passing through said at least one electric actuator.

2. The tubular valve for adjusting the compression ratio of a variable compression ratio engine according to claim 1, wherein the second end (408) of the at least one straight tube (401) is of truncated spherical shape and has a line of contact with the at least one shut-off surface (412).

3. The tubular valve for adjusting the compression ratio of a variable compression ratio engine according to claim 1, wherein the at least one straight tube (401) is connected to the at least one electric actuator (450) by a pull rod (414) of which the attachment to said tube does not completely shut off said tube and leaves open an axial and/or radial passage that allows the hydraulic fluid to flow along inside said tube.

4. The tubular valve for adjusting the compression ratio of a variable compression ratio engine according to claim 3, wherein the end of the pull rod (414) terminates in a pull head (416) of a diameter greater than a hole (417) formed in a surface (418) which seals the first end (407) of the at least one straight tube (401), said rod (414) passing through said hole (417) and said head (416) being housed inside said at least one straight tube (401), the latter comprising at least one radial and/or axial orifice (419) opening into the low-pressure chamber (403).

5. The tubular valve for adjusting the compression ratio of a variable compression ratio engine according to claim 4, wherein the pull head (416) collaborates with a pull ball (440) of a shape that complements a shape of the surface (418), said ball remaining pressed against said surface by a swivel joint spring (441) which moves the at least one straight tube (401) away from the at least one electric actuator (450).

6. The tubular valve for adjusting the compression ratio of a variable compression ratio engine according to claim 3, wherein the end of the pull rod (414) terminates in a flat articulating head (420) pierced with a hole (421) through which a pin (422) passes, the two ends of said pin (422) being housed in holes (423, 424) formed radially in the at least one straight tube (401) near the first end (407) of said tube.

7. The tubular valve for adjusting the compression ratio of a variable compression ratio engine according to claim 3, wherein the at least one electric actuator (450) is housed outside the valve casing (402) whereas the pull rod (414) which connects it to the at least one straight tube (401) passes through the valve casing (402) at the same time forming a seal therewith.

8. The tubular valve for adjusting the compression ratio of a variable compression ratio engine according to claim 3, wherein it comprises a further sealing means for sealing between the pull rod (414) and the valve casing (402), which further sealing means consist of at least one annular seal and/or at least one piston ring.

9. The tubular valve for adjusting the compression ratio of a variable compression ratio engine according to claim 1, wherein the at least one electric actuator (450) is housed in the low-pressure chamber (403).

10. The tubular valve for adjusting the compression ratio of a variable compression ratio engine according to claim 1, wherein the cross section of the at least one straight tube (401) at the seal that said tube makes with the nonreturn tube (425) is smaller than the cross section of said at least one straight tube (401) where it makes contact with the at least one shut-off surface (412).

11. The tubular valve for adjusting the compression ratio of a variable compression ratio engine according to claim 1, wherein the first end (426) of the nonreturn tube (425) which is kept in contact with the nonreturn seat (428) is of truncated spherical shape and has a line of contact with said nonreturn seat (428).

12. The tubular valve for adjusting the compression ratio of a variable compression ratio engine according to claim 1, wherein the at least one nonreturn and shut-off spring (427) bears, at one end, against the at least one straight tube (401)

near the second end (408) thereof, and at the other end against the nonreturn tube (425) near the first end (426) of the nonreturn tube (425).

13. The tubular valve for adjusting the compression ratio of a variable compression ratio engine according to claim 1, wherein an end stop (432) is formed on the nonreturn tube (425) and/or on the at least one straight tube (401), said end stop limiting the maximum distance between the nonreturn tube (425) and the nonreturn seat (428) and in the same proportions limiting the maximum distance between the at least one straight tube (401) and the at least one shut-off surface (412).

14. The tubular valve for adjusting the compression ratio of a variable compression ratio engine according to claim 1, further comprising a further sealing means (409) for sealing between the at least one straight tube (401) and the nonreturn tube (425) which further sealing means consist of at least one annular seal and/or at least one piston ring.

15. The tubular valve for adjusting the compression ratio of a variable compression ratio engine according to claim 1, wherein the at least one electric actuator (450) consists of a coil (451) of conducting wire which attracts a magnetic vane or core plunger (452) when an electric current is passing through said coil.

16. The tubular valve for adjusting the compression ratio of a variable compression ratio engine according to claim 1, when the at least one electric actuator (450) consists of a coil (451) of conducting wire which attracts a core plunger (452) when an electric current is passing through said coil, and the core plunger (452) is attached directly to the at least one straight tube (401).

17. The tubular valve for adjusting the compression ratio of a variable compression ratio engine according to claim 1, wherein the at least one electric actuator (450) consists of a rotary electric motor which is able to turn a screw that is free to rotate with respect to the valve casing (402) but fixed in terms of translational movement with respect to said casing, said screw being screwed directly or indirectly into the at least one straight tube (401) and said tube effecting a translational movement with respect to said casing when said screw is turned under the action of the rotary electric motor.

18. The tubular valve for adjusting the compression ratio of a variable compression ratio engine according to claim 1, wherein the valve casing (402) is made up of at least one component exhibiting symmetry of revolution comprising inlet-outlet ducts fixed to a porting plate (433), said plate (433) itself being attached to the crankcase (100) of the variable compression ratio engine and said plate (433) comprising ducts (434, 435) for communication with the upper (121) and lower (122) chambers of the double-acting hydraulic control actuating cylinder (8) and with the pressure accumulator (251).

19. The tubular valve for adjusting the compression ratio of a variable compression ratio engine according to claim 18, wherein the component exhibiting symmetry of revolution and comprising inlet-outlet ducts is screwed directly onto or into the crankcase (100) of the variable compression ratio engine.

20. The tubular valve for adjusting the compression ratio of a variable compression ratio engine according to claim 1, wherein the at least one electric actuator (450) is fitted with at least one adjustable or non-adjustable valve end stop (455) that limits the maximum linear translational travel of the at least one straight tube (401).

21. The tubular valve for adjusting the compression ratio of a variable compression ratio engine according to claim 1, wherein the at least one electric actuator (450) is fitted with two adjustable or non-adjustable valve end stops (455, 456), the first end stop (455) limiting the distance between the at least one straight tube (401) and the at least one shut-off surface (412) to a small value, and the second end stop (456) limiting the distance between said at least one straight tube (401) and said surface to a maximum value, travel beyond the first end stop (455) being possible once the force produced by the at least one electric actuator (450) exceeds a certain force, whereas travel beyond the second end stop (456) is never possible, whatever the force produced by said at least one electric actuator.

22. The tubular valve for adjusting the compression ratio of a variable compression ratio engine according to claim 21, wherein the second end stop (456) of the at least one electric actuator (450) consists of a preloaded spring (459) which rests against a return end stop (458) when the at least one electric actuator (450) is not producing enough force to separate said spring (459) from said return end stop (458).

23. The tubular valve for adjusting the compression ratio of a variable compression ratio engine according to claim 1, wherein the at least one electric actuator (450) consists of a coil (451) of conducting wire which attracts a core plunger (452) when an electric current is passing through said coil, and the core plunger (452) is housed in the low-pressure chamber (403), whereas the coil (451) is housed outside said chamber (403), and the magnetic field generated by said coil (451), when an electric current is passing through it, passing through a coil sleeve (454) secured to the valve casing (402) so as to attract said core plunger (452).

24. The tubular valve for adjusting the compression ratio of a variable compression ratio engine according to claim 1, wherein the at least one shut-off surface (412) secured to the valve casing (402) is formed on the internal face of a shut-off plug (457) screwed into said casing (402), said plug (457) comprising at least one axial and/or radial orifice (460) positioned at the external periphery of the region of contact between the at least one straight tube (401) and said at least one shut-off surface (412), and at least one said orifice (460) directly or indirectly connecting the high-pressure chamber (405) to one or other of the upper (121) or lower (122) chambers of the control actuating cylinder (8).

25. The tubular valve for adjusting the compression ratio of a variable compression ratio engine according to claim 1, wherein the nonreturn seat (428) is formed on one of the faces of a nonreturn seat carrier (461) of substantially cylindrical shape housed in the valve casing (402), said seat carrier (461) being fitted with at least one duct and/or canal (462) that allows the hydraulic fluid to pass from the low-pressure chamber (403) to the high-pressure chamber (405) when the nonreturn tube (425) is not in contact with the nonreturn seat (428), and allowing said hydraulic fluid to pass from the high-pressure chamber (405) to the low-pressure chamber (403) when the at least one straight tube (401) is not in contact with the at least one shut-off surface (412).

26. The tubular valve for adjusting the compression ratio of a variable compression ratio engine according to claim 24, wherein the shut-off plug (457) screwed into the valve casing (402) compresses the nonreturn seat carrier (461) and/or the coil sleeve (454) so that said plug (457) constitutes the element that attaches said seat carrier (461) and said coil sleeve (454) to said valve casing (402).

* * * * *